Dec. 24, 1963  D. P. TASSIE ETAL  3,115,062
TURRET MOUNT

Filed April 2, 1962  2 Sheets-Sheet 1

INVENTORS
DOUGLAS P. TASSIE
LEWIS K. WETZEL
BY
ATTORNEY

Dec. 24, 1963     D. P. TASSIE ETAL     3,115,062

TURRET MOUNT

Filed April 2, 1962     2 Sheets-Sheet 2

INVENTORS
DOUGLAS P. TASSIE
LEWIS K. WETZEL
BY
ATTORNEY

United States Patent Office 3,115,062
Patented Dec. 24, 1963

3,115,062
TURRET MOUNT
Douglas P. Tassie, St. George, and Lewis K. Wetzel, Burlington, Vt., assignors to General Electric Company, a corporation of New York
Filed Apr. 2, 1962, Ser. No. 184,087
11 Claims. (Cl. 89—37)

The present invention relates to a turret mount and more particularly to an improved recoil absorbing turret mount assembly.

There are many devices that develop reaction or recoil forces when operated. For example, a ballistic weapon, such as a gun, will normally develop certain reaction or recoil forces that may cause the particular device when operated to deviate from a desired operating alignment on a target. When such ballistic devices as guns are mounted on airframe vehicles such as helicopters or the like, the mounting arrangement must be as light as possible yet fully maneuverable and responsive to remote control. Previously slide mechanisms have been utilized to absorb or buffer the reaction or recoil forces, which may be either of a low or high rate, but the slide mechanisms require close tolerance slides that are expensive to manufacture and are subject to wear and damage. It is, therefore, desirable to provide an inexpensive dynamic mount for airframes and helicopters or the like that will absorb or buffer these reaction or recoil forces while maintaining the desired alignment, be easy to manufacture, and have a longer usable life.

Accordingly, it is an object of the present invention to provide a new and improved turret mount.

A further object of the present invention is to provide a new and improved turret mount which will absorb reaction or recoil forces.

Another object of the present invention is to provide a new and improved recoil absorbing turret mount which will maintain a desired alignment during recoil.

Yet another object of the present invention is to provide a new and improved recoil absorbing turret mount that is simple and light weight, inexpensive to manufacture, and reliable in operation.

Still another object of the present invention is to provide a new and improved recoil absorbing turret mount that is easily attached to an airframe such as a helicopter or the like.

Briefly, in one embodiment of the invention, a gun is mounted so as to form one link of a parallelogram linkage. An actuating arm is provided to position this linkage as desired, thereby permitting the gun to be given a desired azimuth. The entire parallelogram linkage is supported by a torque transmitting tube which is mounted so that it can be rotated about its longitudinal axis. Rotation of this torque tube consequently rotates the parallelogram linkage and permits the gun to be aimed in elevation.

One link of the parallelogram has an extension which protrudes into the torque tube and is pivotally mounted on a trunnion axis therein. Movement of this extension about the trunnion axis is retarded by springs acting on the end of the extension. As a result, when the gun recoils, the springs tend to return it to its original position. Even while recoil of the gun is occurring, the orientation of the gun is not changed; there is merely a slight sidewise displacement.

The organization and operation, together with further objects and advantages of the invention, may best be understood by reference to the following description taken in connection with the accompanying drawings, in which.

Figure 1:
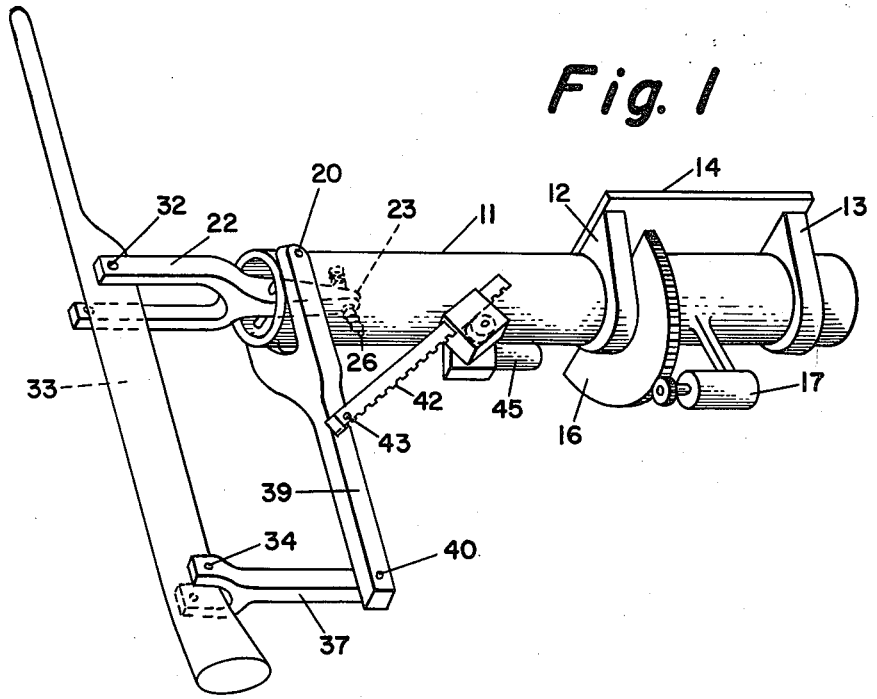
FIGURE 1 is a schematic perspective of one form of the new and improved turret mount of the present invention.

Referring to FIGURE 1 of the drawings, torque tube 11 is supported for rotation about its longitudinal axis by parallel and spaced pillow blocks 12 and 13 which are individually secured to a suitable base plate 14. Base plate 14, as shown by FIGURE 1, is an indication of one base plate configuration that can be utilized with the invention being described. Base plate 14 supports the turret mount and may be designed to be attached to a vehicle such as a helicopter airframe without requiring substantial modification of the vehicle. Rotational motion is imparted to torque tube 11 by means of a suitable sector gear 16 secured to pillow block 12 upon which an indexing motor and gear means 17 reacts. The torque tube 11 has a pivot or trunnion axis 20 at one end of the tube to pivotally support a forward link 22 that in the arrangement shown has an extension 23 retained within torque tube 11.

Figure 2:
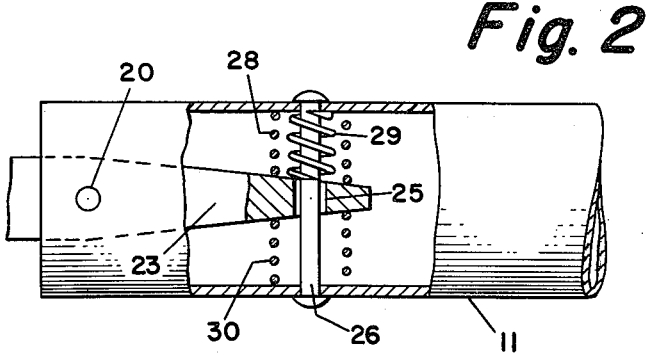
FIGURE 2 is a plan view, partially broken away of a detail of FIGURE 1.

As shown in FIGURE 2, the extension 23 of forward link 22 has an aperture 25 therein to slidably engage a suitable rod 26 extending transversely to the longitudinal axis of the torque tube 11. A low rate recoil spring 28 and a high rate recoil spring 29 are concentrically positioned on the rod 26. A counter-recoil spring 30 is also concentrically positioned on the rod 26 so that the extension 23 of the forward link 22 is juxtaposed between the low rate spring 28 and the counter-recoil spring 30. Although coil springs are shown by FIGURE 2, it is to be understood that other forms of resilient means can be utilized; for example, disk or ring-type springs.

Referring again to FIGURE 1, forward link 22 may be suitably formed to pivotally engage a forward support axis 32 of a gun 33. If desired, a gun supporting member can be utilized here instead of the gun itself. Gun 33 has an aft support axis 34 spaced from the forward support axis 32. One end of an aft link 37 is pivotally secured to the aft support axis 34 of gun 33. The other end of aft link 37 is pivotally secured to an actuating arm 39 at a pivotal point 40. Actuating arm 39 is pivotally supported at the opposite end at the trunnion axis 20. In accordance with the invention, forward link 22 has a length between the forward support axis 32 and the trunnion axis 20 that is equal to and parallel with the length of aft link 37 between the aft support axis 34 and the pivotal axis 40. Similarly, the length between the forward support axis 32 and the aft support axis 34 of gun 33 is equal to the length between the trunnion axis 20 and the pivotal axis 40 of actuating arm 39. Thus, forward link 22, gun 33, aft link 37, and actuating arm 39 form a link parallelogram.

An adjustable actuator 42 is pivotally secured at a generally intermediate point 43 on actuating arm 39 and may be driven by a suitable indexing motor and gear means 45 to cause actuating arm 39 to exhibit arcuate movement about the pivotal point defined by the trunnion axis 20. The indexing motor and gear means 17 and the indexing motor and gear means 45 provide a means for remote directing of the turret mount of the invention, and more particularly for the directing of gun 33 in both azimuth and elevation from a remote location. When adjustable actuator 42 is positioned as desired by the indexing means 45, actuating arm 39 will form a rigid or fixed base for the link parallelogram previously defined. A recoil force impressed by gun 33 in the general direction from the forward support axis 32 towards the aft support axis 34 will cause the link parallelogram to exhibit a limited movement in the direction of the impressed recoil force while maintaining the direction of gun 33 throughout recoil. The deflection of the link parallelogram about actuating arm 39 in a particular fixed position is limited initially by the low recoil rate spring 28, and at a more advanced movement of the parallelogram by both the low recoil rate spring 28 and the high recoil rate spring 29. The low rate spring 28 and the high rate spring 29 effectively absorb either low rate or high rate recoil forces that are impressed upon the link parallelogram previously described and return the link parallelogram to a normal rest position by the forces they impress on the extension 23 of forward link 22. Overcompensation of the parallelogram, by either the low rate spring 28 or the high rate spring 29 or both, compresses the counter-recoil spring 30 which will return the flexible link parallelogram previously defined to a normal rest position as shown by FIGURE 1. It is to be understood that the low recoil rate spring 28 will often be sufficient for a particular turret mount when formed in accordance with the present invention. This is particularly true when a single recoil rate is impressed upon the parallelogram rather than a dual rate, i.e., low recoil and high recoil rates. The turret mount shown by FIGURE 1 provides a correlation between the spring deflection rates of the resilient means utilized in the turret mount and the lengths of the forward link 22 and its extension 23 as lever arms acting about trunnion axis 20 which acts as the fulcrum or pivot point for the lever arms. Thus, based on design parameters, a singular resilient means such as the low recoil rate spring 28 will provide the necessary buffer for an impressed recoil force. However, when either low rate or high rate recoil forces or both are impressed upon the link parallelogram, for example by a dual rate of fire gun, design parameters may require a dual rate resilient means such as shown by FIGURE 1.

Figure 3:
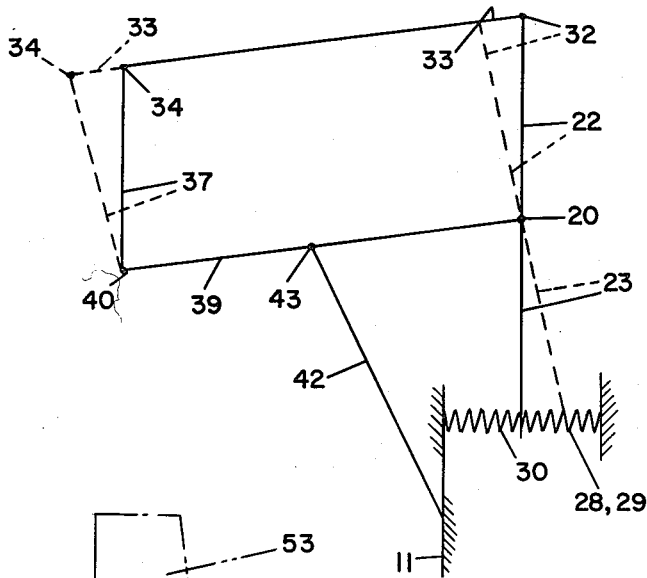
FIGURE 3 is a schematic representation of the turret mount shown by FIGURE 1.

The normal rest position of the flexible link parallelogram and the resilient recoil absorbing means as shown by FIGURE 1 and previously described is schematically shown by the solid lines of FIGURE 3. When a recoil force is impressed upon the link parallelogram in a direction from the forward support axis 32 towards the aft support axis 34, the link parallelogram, having a flexible construction as previously described, is deflected with reference to the fixed actuating arm 39 to a general position such as shown by the dashed lines in FIGURE 3. The extension 23 of forward link 22 acts upon and is limited by either the low recoil rate spring 28 or the high recoil rate spring 29 or both and is returned as previously described to the rest position shown by the solid lines in FIGURE 3.

Figure 4:
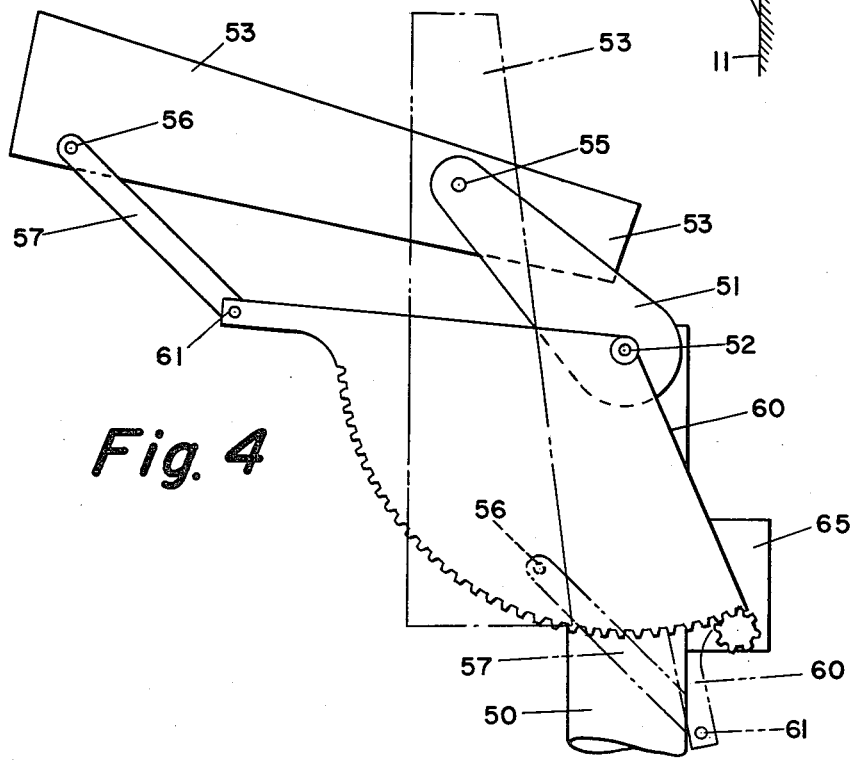
FIGURE 4 is a plan view of a modification of the new and improved turret mount shown by FIGURE 1 in two positions.

A modification of the new and improved turret mount 10, as shown by FIGURE 1, is shown by FIGURE 4 in one maximum position in solid lines. A torque tube 50 of the turret mount shown by FIGURE 3 has a suitably formed forward link 51 pivotally secured on a trunnion axis 52 at one end of the torque tube 50. The forward link 51 has a suitable inwardly extending portion, not shown, similar to that previously described and shown by FIGURES 1 and 2 engaging recoil absorbing springs also previously described. A gun support member 53 is pivotally secured to forward link 51 on a forward support axis 55. The gun support member 53 has an aft support axis 56 spaced from the forward support axis 55. Aft link 57 is pivotally secured at one end to the aft support axis 56 of the gun support member 53. Aft link 57 is also pivotally secured to an actuating sector arm 60 at a pivotal point 61. Actuating sector arm 60 is supported and pivotally secured to the trunnion axis 52. A link parallelogram, similar to that described previously and shown by FIGURE 1, is thus formed by the opposite and equal in length members, i.e., forward link 51, gun support member 53, aft link 57, and actuating sector arm 60.

Actuating sector arm 60 is adapted to be arcuately moved about trunnion axis 52 by a suitable indexing motor and gear means 65 so that the link parallelogram, and particularly gun support member 53, may be arcuately moved to any position from that shown in solid lines to the other maximum as indicated by the broken lines in FIGURE 4. A recoil or reaction force impressed upon the gun support member 53 in the general direction from the forward support axis 55 towards the aft support axis 56 will cause the link parallelogram as previously defined to exhibit a limited movement or motion in the direction of the impressed recoil force. The deflection caused by the impressed recoil force causes the forward link 51 with its suitable inwardly extending portion similar to that shown by FIGURE 1, although not shown by FIGURE 4 to absorb the recoil and counter-recoil forces and return the link parallelogram as defined to a normal rest position.

It should now be understood that, with the arrangements of the turret mounts shown by FIGURE 1 or by FIGURE 4, an impressed recoil or reaction force on the various link parallelogram structures as previously shown and described is absorbed by the recoil spring and counter-recoil spring arrangement within the torque tube. The resilient spring means can alternatively be positioned outside the torque tube and act upon either the inwardly extending portion of the forward link or directly upon other portions of the link parallelogram as described. The limited deflection of the link parallelogram by the impressed recoil force thereon permits the gun support member or gun or any reaction developing means substituted therefor to exhibit a limited movement with regard to the adjustable actuating arm which serves as a fixed reference base for the parallelogram. The link parallelogram acting in combination with the resilient recoil absorbing means of the turret mount maintains a desired alignment of the gun, or means substituted therefor, on a target during the absorption of intermittent recoil forces by the resilient means. Compensation for plural or single rates of recoil is made possible by the suitable resilient means, i.e., plural springs having different recoil rates or a singular spring having a fixed recoil rate. It is contemplated that the turret mount of the present invention may have any suitable resilient recoil means alternatively used for the concentrically positioned springs as shown by FIGURE 2 and described previously. Further, the trunnion axis can be positioned outside or above the torque tube while the resilient recoil absorbing means can be positioned to act upon the forward link at locations other than the location as shown by FIGURE 1 and previously described.

As will be evidenced from the foregoing description, certain aspects of the invention are not limited to the particular details of the constructions illustrated. Although certain modifications of the new and improved turret gun mount have been shown and described above, it is contemplated that other modifications and applications will occur to those skilled in the art. It should be understood that the mount of the invention may be used to absorb recoil forces developed by devices other than guns, such as fire hose nozzles or the like. In addition, it is evident that a similar gun supporting linkage could be mounted on the other end of the torque tube. It is, therefore, intended that the appended claims shall cover such modifications and applications that do not depart from the true spirit and scope of the invention.

What is claimed as new and desired to be secured by Letters Patent of the United States is:

1. A turret mount comprising:

a torque tube supported for rotational movement about one axis of said tube, a trunnion axis at one end of said tube generally perpendicular to said tube axis, a first member pivotally mounted on said trunnion axis, a second member pivotally supported by said first member on a first support axis, a second support axis on said second member,
a third member having first and seconds ends,
said first end of said third member pivotally mounted on said trunnion axis,
a fourth member pivotally secured to a pivotal axis on said second end of said third member and to said second support axis on said second member,
said fourth member having a length between said second support axis and said pivotal axis equal to the length between said first support axis and said trunnion axis,
said third member having a length between said trunnion axis and said pivotal axis equal to the length between said first support axis and said second support axis, and
resilient means to restrain arcuate movement of said first member about said trunnion axis whereby said first member, second member, third member, and fourth member form a link parallelogram so constructed to maintain a desired alignment of said second member while said resilient means absorbs intermittent recoil and counter-recoil forces impressed upon said parallelogram.

2. A turret mount comprising:
a torque tube supported for rotational movement about one axis of said tube,
a trunnion axis at one end of said tube generally perpendicular to said tube axis,
a first member pivotally mounted on said trunnion axis and having respective first and second portions extending outwardly from and inwardly into said tube from said trunnion axis,
resilient means acting upon said second portion to restrain arcuate movement of said first member about said trunnion axis,
a second member pivotally supported by said first portion on a first support axis,
a second support axis on said second member,
a third member having first and second ends,
said first end of said third member pivotally mounted on said trunnion axis, and
a fourth member pivotally secured to a pivotal axis on said second end of said third member and to said second support axis on said second member,
said fourth member having a length between said second support axis and said pivotal axis equal to the length between said first support axis and said trunnion axis,
said third member having a length betweent said trunnion axis and said pivotal axis equal to the length between said first support axis and said second support axis whereby said first portion, second member, third member, and fourth member form a link parallelogram so constructed to maintain a desired alignment of said second member while said resilient means absorbs intermittent recoil and counter-recoil forces impressed upon said parallelogram.

3. The turret mount of claim 2 in which said tube axis is a longitudinal axis.

4. A turret mount comprising:
a base plate having a pair of pillow blocks parallel to and spaced from each other,
a torque tube supported along a longitudinal axis by said pillow blocks,
means for imparting rotation to said tube about said longitudinal axis,
a trunnion axis at one end of said tube generally perpendicular to said longitudinal axis,
a recoil member pivotally mounted on said trunnion axis and having respective first and second portions extending outwardly from and inwardly into said tube from said trunnion axis,
recoil spring means acting upon said second portion to constrain arcuate movement of said recoil member about said trunnion axis,
a support member pivotally supported by said first portion on a first support axis,
a second support axis on said support member,
an acuating arm having first and second ends,
said first end of said actuating arm pivotally mounted on said trunnion axis, and
a link member pivotally secured to a pivotal axis on said second end of said actuating arm and to said second support axis on said support member,
said link member having a length between said second support axis and said pivotal axis equal to the length between said first support axis and said trunnion axis,
said actuating arm having a length between said trunnion axis and said pivotal axis equal to the length between said first support axis and said second support axis whereby said first portion, support member, actuating arm, and link member form a link parallelogram so constructed to maintain a desired alignment of said support member while said recoil spring means absorbs intermittent recoil and counter-recoil forces impressed upon said parallelogram.

5. The turret mount of claim 4 in which said support member is a ballistic weapon.

6. A turret mount comprising:
a torque tube supported for rotational movement about a longitudinal axis,
a trunnion axis at one end of said tube perpendicular to said longitudinal axis,
a first member pivotally mounted on said trunnion axis and having respective first and second portions extending outwardly from and inwardly into said tube from said trunnion axis,
resilient means acting upon said second portion to constrain arcuate movement of said first member about said trunnion axis,
a second member pivotally supported by said first portion on a first support axis,
a second support axis on said second member,
a third member having first and second ends,
said first end of said third member pivotally mounted on said trunnion axis,
a fourth member pivotally secured to a pivotal axis on said second end of said third member and to said second support axis on said second member,
said fourth member having a length between said second support axis and said pivotal axis equal to the length between said first support axis and said trunnion axis,
said third member having a length between said trunnion axis and said pivotal axis equal to the length between said first support axis and said second support axis, and
an adjustable actuator pivotally secured to said third member at a point intermediate said first and second ends of said third member whereby said first portion, second member, third member, and fourth member form a flexible link parallelogram constructed to maintain a desired alignment of said second member while said resilient means absorbs intermittent recoil and counter-recoil forces impressed upon said parallelogram.

7. A turret mount comprising:
a base plate having a pair of pillow blocks parallel to and spaced from each other,
a torque tube supported along a longitudinal axis by said pillow blocks,
means for imparting rotation to said tube about said longitudinal axis,
a trunnion axis at one end of said tube generally perpendicular to said longitudinal axis,
a recoil member pivotally mounted on said trunnion axis and having respective first and second portions extending outwardly from and inwardly into said tube from said trunnion axis,
recoil spring means acting upon said second portion to constrain arcuate movement of said recoil member about said trunnion axis,
a support member pivotally supported by said first portion on a first support axis,
a second support axis on said support member,
an actuating arm having first and second ends,
said first end of said actuating arm pivotally mounted on said trunnion axis,
a link member pivotally secured to a pivotal axis on said second end of said actuating arm and to said second support axis on said support member,
said link member having a length between said second support axis and said pivotal axis equal to the length between said first support axis and said trunnion axis,
said actuating arm having a length between said trunnion axis and said pivotal axis equal to the length between said first support axis and said second support axis, and
an adjustable actuator pivotally secured to said actuating arm at a point intermediate said first and second ends whereby said first portion, support member, actuating arm, and link member form a link parallelogram so constructed to maintain a desired alignment of said support member while said recoil spring means absorbs intermittent recoil and counter-recoil forces impressed upon said parallelogram.

8. A turret mount of claim 7 in which said support member is a ballistic weapon.

9. A turret mount comprising:
a base plate having a pair of pillow blocks parallel to and spaced from each other,
a torque tube supported along a longitudinal axis by said pillow blocks,
a trunnion axis at one end of said tube generally perpendicular to said longitudinal axis,
a recoil member pivotally mounted on said trunnion axis and having respective first and second portions extending outwardly from and inwardly into said tube from said trunnion axis,
recoil spring means acting upon said second portion to constrain arcuate movement of said recoil member about said trunnion axis,
a gun pivotally supported by said first portion on a first support axis,
means for imparting rotation to said tube about said longitudinal axis for elevation of said gun,
a second support axis on said gun,
an actuating arm having first and second ends,
said first end of said actuating arm pivotally mounted on said trunnion axis,
a link member pivotally secured to a pivotal axis on said second end of said actuating arm and to said second support axis on said gun,
said link member having a length between said second support axis and said pivotal axis equal to the length between said first support axis and said trunnion axis,
said actuating arm having a length between said trunnion axis and said pivotal axis equal to the length between said first support axis and said second support axis, and
an adjustable azimuth actuator pivotally secured to said actuating arm at a point intermediate said first and second ends whereby said first portion, gun, actuating arm, and link member form a link parallelogram so constructed to maintain a desired alignment of said gun while said recoil spring means absorbs intermittent recoil and counter-recoil forces impressed upon said parallelogram.

10. A turret mount comprising:
a base plate,
a torque tube rotatably mounted on said base plate,
means for rotating said torque tube to a desired position,
a trunnion axis at one end of said torque tube,
a first link pivotally mounted on said trunnion axis,
a gun,
said first link having a first pivotal support for said gun,
a second link,
said second link having a second pivotal support for said gun,
an actuating arm pivotally connected between said first and second links and spaced from said gun,
the length of said gun between said first and second pivotal supports being equal to the length of said actuating arm between its pivotal connections,
the length of said first link between said first pivotal support and its pivotal connection to said actuating arm being equal to the length of said second link between said second pivotal support and its pivotal connection to said actuating arm,
resilient means for restricting the movement of said first link about said trunnion axis, and
actuating arm positioning means for moving said actuating arm to a desired position and maintaining it whereby the positioning of said torque tube and the positioning of said actuating arm perform a resultant positioning of said gun in a desired direction.

11. A turret mount comprising:
a base plate,
a torque tube rotatably mounted on said base plate,
means for rotating said torque tube to a desired position,
a trunnion axis at one end of said torque tube,
a forward link pivotally mounted on said trunnion axis,
a gun,
said forward link having a forward pivotal support for said gun,
an aft link,
said aft link having an aft pivotal support for said gun,
an actuating arm pivotally connected between said forward and aft links and spaced from said gun,
the length of said gun between said forward and aft pivotal supports being equal to the length of said actuating arm between its pivotal connections,
the length of said forward link between said forward pivotal support and its pivotal connection to said actuating arm being equal to the length of said aft link between said aft pivotal support and its pivotal connection to said actuating arm,
resilient means for restricting the movement of said forward link about said trunnion axis, and
actuating arm positioning means for moving said actuating arm to a desired position and maintaining it whereby the positioning of said torque tube and the positioning of said actuating arm perform a resultant positioning of said gun in a desired direction.

References Cited in the file of this patent
UNITED STATES PATENTS

| | | |
|---|---|---|
| 499,315 | Borchardt | June 13, 1893 |
| 1,303,023 | Buckham | May 6, 1919 |
| 1,322,124 | Lawrence | Nov. 18, 1919 |
| 1,700,902 | Le Prieur | Feb. 5, 1929 |
| 2,336,557 | McCallister | Dec. 14, 1943 |
| 2,406,102 | Pontius et al. | Aug. 20, 1946 |

FOREIGN PATENTS

| | | |
|---|---|---|
| 849,186 | France | Aug. 7, 1934 |